United States Patent
Johnson et al.

(10) Patent No.: US 9,015,840 B2
(45) Date of Patent: Apr. 21, 2015

(54) PORTABLE MEDIA SYSTEM WITH VIRUS BLOCKER AND METHOD OF OPERATION THEREOF

(75) Inventors: Simon B. Johnson, Bonney Lake, WA (US); Lev M. Bolotin, Kirkland, WA (US)

(73) Assignee: ClevX, LLC, Kirkland, WA (US)

( * ) Notice: Subject to any disclaimer, the term of this patent is extended or adjusted under 35 U.S.C. 154(b) by 849 days.

(21) Appl. No.: 12/796,665

(22) Filed: Jun. 8, 2010

(65) Prior Publication Data

US 2010/0313271 A1  Dec. 9, 2010

Related U.S. Application Data (60) Provisional application No. 61/185,193, filed on Jun. 8, 2009.

(51) Int. Cl.
*G06F 21/56* (2013.01)
*G06F 21/79* (2013.01)

(52) U.S. Cl.
CPC .............. *G06F 21/56* (2013.01); *G06F 21/79* (2013.01)

(58) Field of Classification Search
CPC ..... G06F 21/79; G06F 21/56; G06F 11/3034; G06F 11/3037; G06F 11/3072; G06F 11/3003
USPC ........... 726/22–25; 713/2, 188; 711/163, 115
See application file for complete search history.

(56) References Cited

U.S. PATENT DOCUMENTS

| | | | | |
|---|---|---|---|---|
| 5,559,960 | A  * | 9/1996 | Lettvin | 726/24 |
| 5,826,012 | A  * | 10/1998 | Lettvin | 726/22 |
| 6,842,861 | B1 * | 1/2005 | Cox et al. | 713/188 |
| 7,591,018 | B1 * | 9/2009 | Lee | 726/24 |
| 7,716,741 | B2 * | 5/2010 | Forman et al. | 726/24 |
| 7,930,531 | B2 * | 4/2011 | Chow et al. | 713/2 |
| 7,938,863 | B2 * | 5/2011 | Skinner et al. | 726/35 |
| 7,975,304 | B2 * | 7/2011 | Lu | 726/24 |
| 8,826,435 | B1 * | 9/2014 | Chiang et al. | 726/24 |
| 2004/0172551 | A1 * | 9/2004 | Fielding et al. | 713/200 |
| 2006/0004974 | A1 * | 1/2006 | Lin et al. | 711/164 |
| 2007/0061894 | A1 * | 3/2007 | Skinner et al. | 726/28 |
| 2007/0113279 | A1 * | 5/2007 | Wang et al. | 726/20 |
| 2007/0261118 | A1 * | 11/2007 | Lu | 726/24 |
| 2008/0082813 | A1 * | 4/2008 | Chow et al. | 713/2 |
| 2008/0109903 | A1 * | 5/2008 | Werner et al. | 726/22 |
| 2009/0113128 | A1 * | 4/2009 | Zhao | 711/115 |

* cited by examiner

*Primary Examiner* — Zachary A Davis
(74) *Attorney, Agent, or Firm* — Ishimaru & Associates LLP (57) ABSTRACT

A portable media system with a host computer system and method of operation thereof includes: accessing a public partition of the portable media system for a virus blocker for activation on the host computer system, the portable media system having a private partition for storing a file; sending a command from the virus blocker on the host computer system to open the private partition in the portable media system when the virus blocker is downloaded on the host computer system; blocking transfer of a virus between the host computer system and the portable media system with the virus blocker executing on the host computer system; and sending a command from the virus blocker on the host computer system to close the private partition when the virus blocker terminates activity on the host computer system.

15 Claims, 6 Drawing Sheets

PORTABLE MEDIA SYSTEM WITH VIRUS BLOCKER AND METHOD OF OPERATION THEREOF

CROSS-REFERENCE TO RELATED APPLICATION(S)

This application claims the benefit of U.S. Provisional Patent Application Ser. No. 61/185,193 filed Jun. 8, 2009, and the subject matter thereof is incorporated herein by reference thereto.

TECHNICAL FIELD

The present invention relates generally to a portable media system, and more particularly to a virus protection system for portable memory drives and mobile devices containing memory.

BACKGROUND ART

Viruses have been spreading for a long time from one host computer system to another by the various networks that connect them. With the increasing popularity of portable media systems, such as flash memory drives, viruses are now copying themselves into portable media systems and then again to other host computer systems when the portable media system(s) is/are connected to them. In this manner, viruses are able to spread between host computer systems even when no network is used.

A growing trend is to put anti-virus (AV) software on the host computer system and/or portable media systems and provide a means of scanning files before they are written to the portable media systems. It has been found that there are some problems using this approach The AV software often requires a time-consuming installation procedure to be performed prior to activation on the portable media system.

Often AV software stored on the portable media system may conflict with AV software already on a host computer system and cause both to become inoperative.

As the memory capacity of the portable media system continues to increase, a complete scan of the portable media system by the AV software stored on the portable media system becomes impractical because of the time required.

AV software often comes equipped with features unrelated to scanning the portable media system, making it expensive and impractical for widespread distribution on portable media systems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a portable media system with a host computer system that includes: providing the portable media system for connection with the host computer system; and blocking transfer of a computer virus between the host computer system and the portable media system by a virus blocker stored on the portable media system and active on the host computer system.

The present invention provides a portable media system for a host computer system that includes: the portable media system for connection with the host computer system; and a virus blocker stored on the portable media system for activation on the host computer system to block transfer of a computer virus between the host computer system and the portable media system.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, method, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and method steps are not disclosed in detail.

The drawings showing embodiments of the system are semi-diagrammatic and not to scale. Similarly, although the views in the drawings for ease of description generally show similar orientations, this depiction in the FIGS. is arbitrary for the most part. The invention can be operated in any orientation.

Where multiple embodiments are disclosed and described having some features in common, for clarity and ease of illustration, description, and comprehension thereof, similar and like features will ordinarily be described with similar reference numerals.

The term "host computer system" as used herein includes computing devices, such as computers, production machines with embedded computers, smart phones, and other processor-equipped devices which are subject to infiltration by malicious software.

The term "portable media system" means a hand-held device containing solid-state, optical disk, or hard disk memory storage. The term "portable" means that a device is capable of being easily held in one hand like a Flash memory device or portable hard disk drive.

The term "computer virus" is used herein as a catch-all phrase to include all types of malicious software, such as computer viruses, computer worms, Trojan horses, spyware, dishonest adware, and other malicious and unwanted software.

The term "virus blocker" means anti-virus software used to block transfer, contain, delete, or otherwise prevent the transfer of a computer virus.

Figure 1:
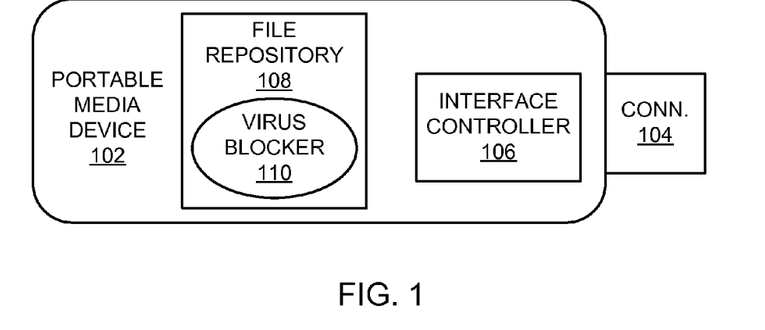
FIG. 1 is a schematic of a portable media system in accordance with an embodiment of the present invention.

Referring now to FIG. 1, therein is shown a schematic of a portable media system 102 in accordance with the present invention. The portable media system 102 is shown as a flash memory device having a USB (universal serial bus) connector 104 at one end.

The portable media system 102 has a file repository 108. A virus blocker 110 is stored as an executable file within the file repository 108. The virus blocker 110, when activated, has the capability of downloading virus signatures from a web-based repository and scan files for possible infections with the latest virus signatures downloaded or previously stored on the portable media system 102. The virus blocker 110, when activated, is able to detect file updates in the file repository 108.

Figure 2:
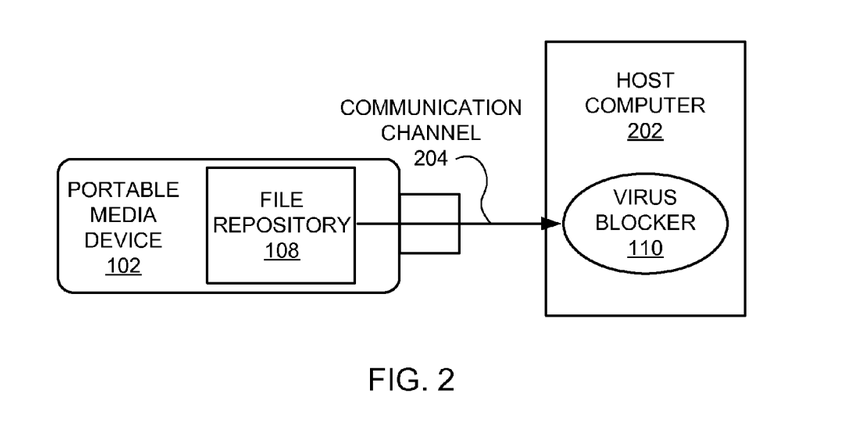
FIG. 2 shows the portable media system connected to the host computer system in accordance with an embodiment of the present invention.

The virus blocker 110 runs in the background of a host computer system 202 of FIG. 2 while a computer user uses the host computer system 202 normally. As a result of running in the background, the virus blocker 110 is able to co-exist with other virus blockers that may already be present on the host computer system 202 and will execute without affecting user productivity. The virus blocker 110 recognizes the transfer of virus-infected data from the host computer system 202 to the portable media system 102.

The connector 104 is connected to an interface controller 106 that manages communication between the host computer system 202 and the portable media system 102. An example of the interface controller 106 would be a USB controller which sends/reads data over a USB bus and reads/sends data to a memory such as a NAND flash. Other types of interface controllers may communicate over Serial Advanced Technology Attachment (SATA), Personal Computer Memory Card International Association (PCMCIA), Integrated Drive Electronics (IDE), etc.

Referring now to FIG. 2, therein is shown the portable media system 102 connected to the host computer system 202 in accordance with an embodiment of the present invention. Once a communication channel 204, which may be through the connector 104 or a wireless connection, is established, the host computer system 202 downloads the virus blocker 110 into the memory of the host computer system 202 for execution.

The virus blocker 110 contains programming that during execution updates its database through the host computer system 202 from a remote location via the internet to be able to detect viruses. Signature-based malware detection involves searching for known malicious patterns and executable code. Signature-less malware detection uses heuristic approaches by looking for known malicious code, or slight variations of such codes. Some virus blockers can also predict what a file will do if opened/run by emulating it in a sandbox or security mechanism for separating running programs.

The virus blocker 110 then monitors the file repository 108 in the portable media system 102 for file accesses, such as reads, writes, or executes. The portable media system 102 includes programming for monitoring for file modifications in real time for new or modified files and scanning only the new or modified files for a computer virus. Using signature comparison, the virus blocker 110 flags infected files within the file repository 108.

Figure 3:
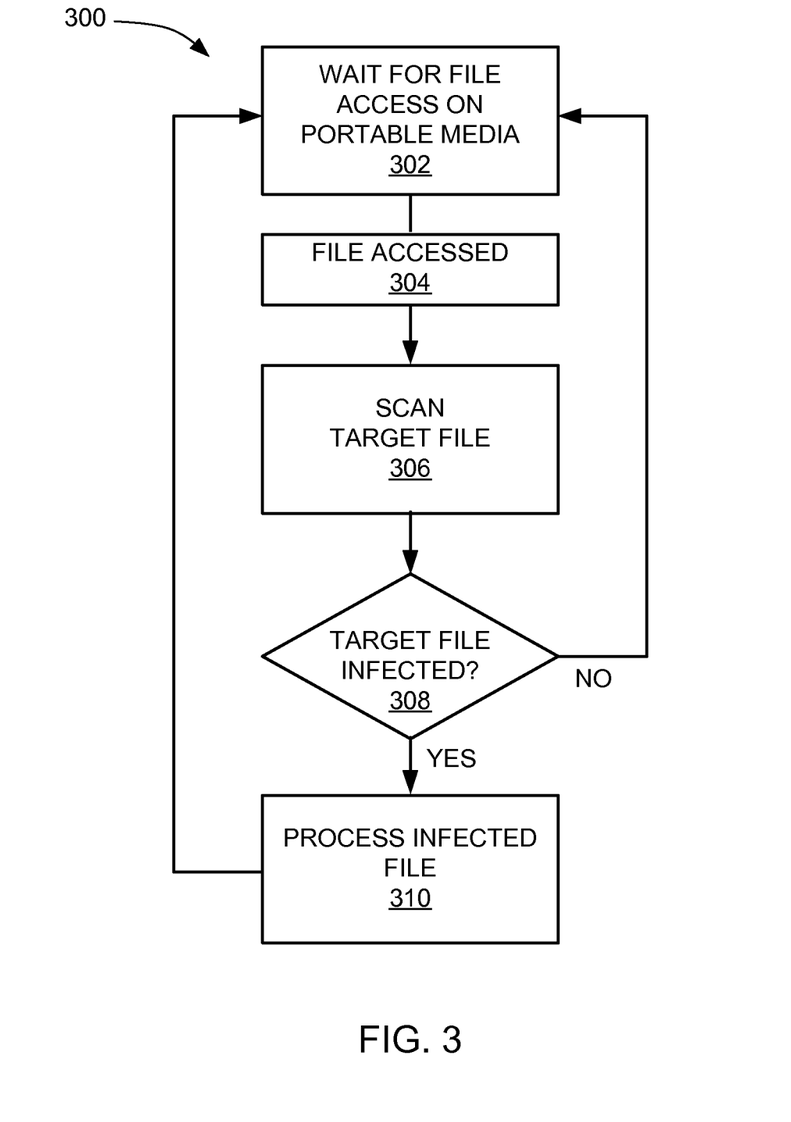
FIG. 3 is a flowchart of a method of blocking viruses from spreading to the portable media system in accordance with an embodiment of the present invention.

Referring now to FIG. 3, therein is shown a flowchart of a method 300 of blocking viruses from spreading to the portable media system 102 in accordance with an embodiment of the present invention.

Once the virus blocker 110 is running on the host computer system 202, it can monitor the file repository 108 of the portable media system 102. The virus blocker 110 monitors the portable media system 102 for file accesses, which include read, write, and execute, by waiting for file access on portable media system in a block 302. When a file is accessed in a block 304, the target file is scanned in a scan target file in a block 306 for a virus signature to determine if the file is infected in a target file infected block 308. If the target file is not infected, the method 300 returns to wait for file access on the portable media system in the block 302.

If the target file is infected, the method 300 proceeds to a process-infected file block 310. The infected file may be processed by being automatically deleted from the portable media system 102, quarantined by modifying the target file to render it ineffective, or querying the user whether to keep or delete the infected file.

Figure 4:
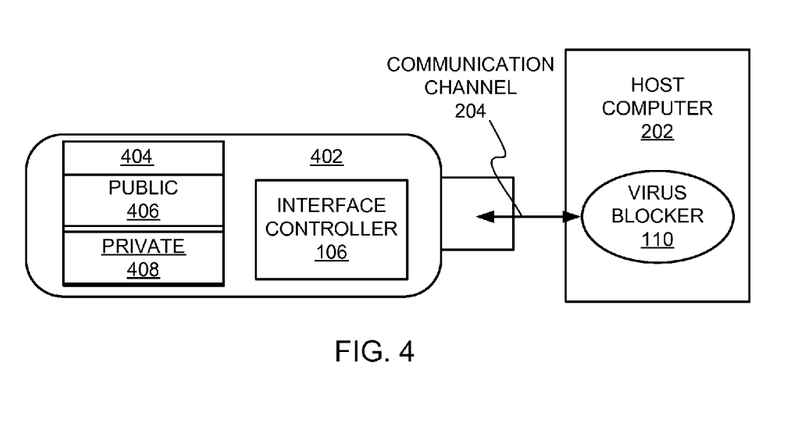
FIG. 4 shows a portable media system in accordance with another embodiment of the present invention.

Referring now to FIG. 4, therein is shown a portable media system 402 in accordance with another embodiment of the present invention. The portable media system 402 has a file repository 404 with a public partition 406 and a private partition 408. The public partition 406 is accessible at all times and is a read-only partition. The public partition 406 contains the virus blocker 110. Once the virus blocker 110 is downloaded from the public partition 406 into the host computer system 202, the virus blocker 110 sends a command over the communication channel 204 to the interface controller 106 to open the private partition 408.

The private partition 408 is not accessible until the virus blocker 110 is activated on the host computer system 202. When execution of the virus blocker 110 is terminated, the virus blocker 110 sends a command over the communication channel 204 to the interface controller 106 to close the private partition 408.

Figure 5:
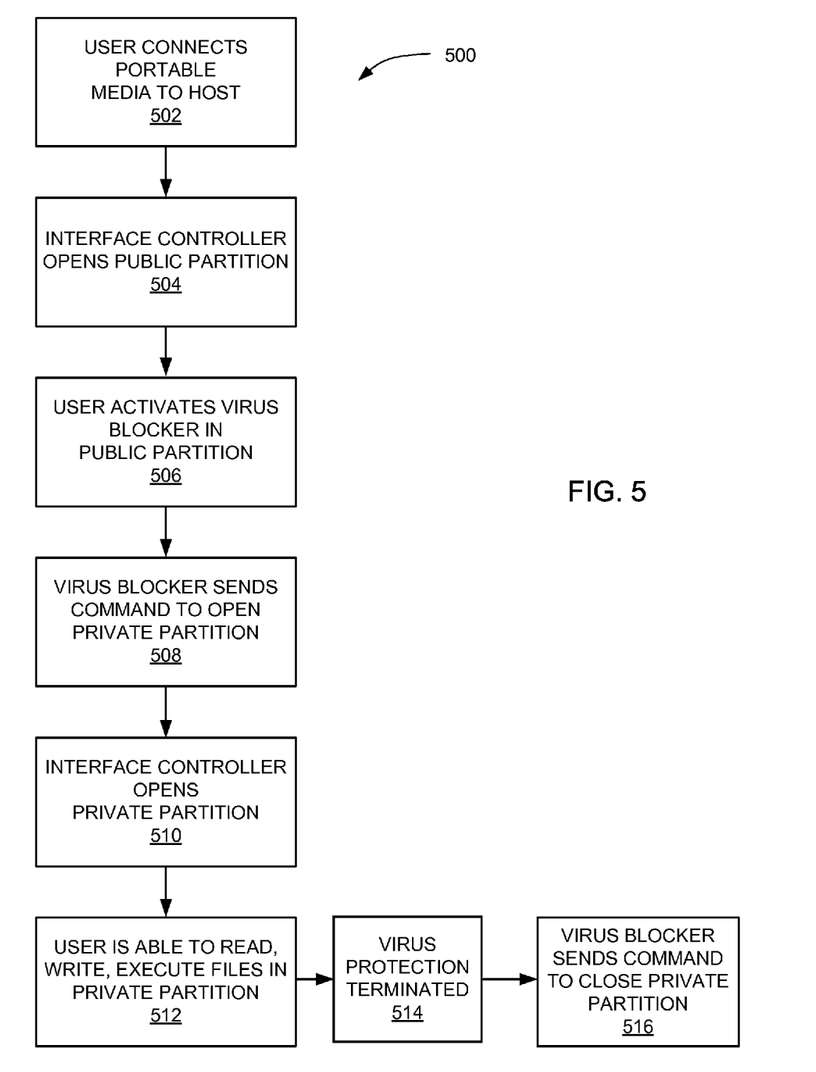
FIG. 5 is a flowchart of a method for allowing access to the private partition of the portable media system of FIG. 4 only when the virus blocker is activated in accordance with an embodiment of the present invention.

Referring now to FIG. 5, therein is shown a flowchart of a method 500 for allowing access to the private partition 408 of the portable media system 402 of FIG. 4 only when the virus blocker 110 is activated in accordance with an embodiment of the present invention. Thus, the method 500 assures that virus protection is enabled when the private partition 408 is being accessed.

The method 500 begins with a user connecting the portable media system to the host computer system in a block 502. The host computer system then performs all the tasks associated with managing the portable media system. The particular tasks are dependent upon the operating system of the host computer system.

The host computer system then communicates with the interface controller and opens the public partition in a block 504. This step makes the public partition accessible by the host computer system and the host computer system assigns a drive letter to the portable media system.

The user activates the virus blocker resident on the public partition in a block 506. This step causes the host computer system to read the virus blocker into memory and begin execution of the virus blocker. Once activated, the virus blocker sends a command to the interface controller of the portable media system to open the private partition in a block 508. The interface controller opens the private partition in the block 510, and this guarantees virus protection is in place prior to granting file access for the host computer system to the portable media system.

Once the virus protection is in place, the user is able to read, write, and/or execute files stored in the private partition of the portable media system in a block 512. All file accesses are now sensed by the virus blocker.

When the virus blocker is terminated in a block 514, the interface controller will automatically close the private partition of the portable media system in a block 516.

Computer applications are typically notified by the operating system they are being terminated and instructed to perform clean-up operations. This is the logical place to close the private partition.

The virus blocker may be terminated by a number of different means, such as user interaction with the virus blocker to shut it down, the virus blocker tasks/processes are terminated by other software running on the computer, or the host computer system shuts down.

Figure 6:
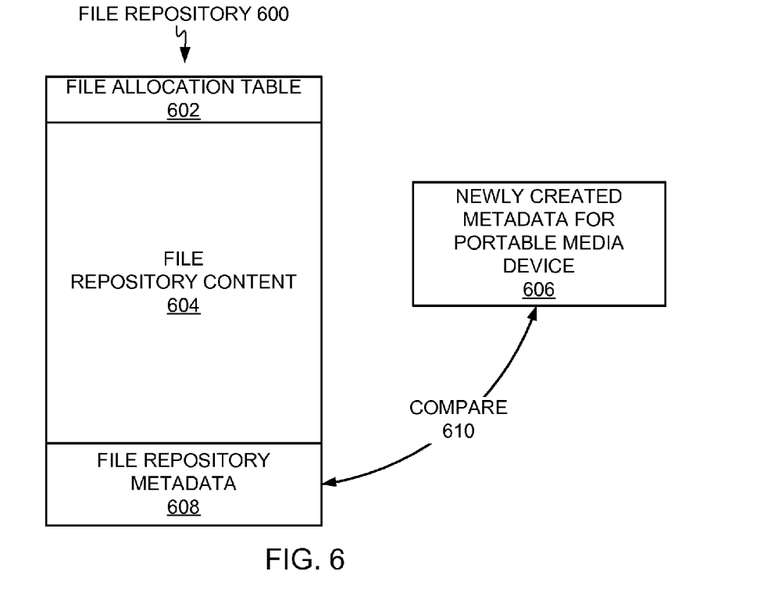
FIG. 6 is a schematic depicting the contents of a file repository in accordance with an embodiment of the present invention.

Referring now to FIG. 6, therein is shown a schematic depicting the contents of a file repository 600 in accordance with an embodiment of the present invention. The file repository 600 generally contains a file allocation table 602 and file repository content 604, or files in memory. The files can be data or text files including complete application programs.

In another embodiment of the present invention, the virus blocker 110 of FIG. 1 can construct newly created metadata in a block 606 regarding files resident on the portable media system 102 of FIG. 1. The metadata may be comprised of such information as file name, size, date, and time. The term "metadata" as used herein is used to describe the definition, structure, and administration of data files with all contents and contexts to ease the use of captured and archived data for future use.

Once invoked, the virus blocker 110 can construct metadata for the current state of the portable media system 102 and compare it with file repository metadata 608 in the file repository 600. In this manner, the virus blocker 110 can detect which files have been written or modified since the last time the virus blocker 110 was run. These files are then scanned for infiltration of viruses. A snapshot of the metadata is stored in the portable media system 102 for future reference. As an example, the change in file size would trigger the scan of the changed file.

Once the newly created metadata in the block 606 and the file repository metadata 608 have undergone comparison 610, the newly created metadata in the block 606 is written to the file repository 600 replacing the file repository metadata 608. A copy of the newly created metadata in block 606 can be written to any non-volatile memory, either on the portable media system 102 or on the host computer system 202.

For example, the host computer system 202 may keep multiple copies of metadata from multiple portable media systems that have been previously connected. Thus, the host computer system 202 is able to detect if a particular portable media system was used on a different host computer system.

The virus blocker includes programming for constructing metadata in the host computer system for comparison with metadata in the portable media system for tracking portable media system file changes, interoperability history, and a combination thereof. The term "interoperability history" refers to tracking the history of different portable media system changes to a host computer system and/or tracking different host computer systems that are connected to a portable media system.

Figure 7:
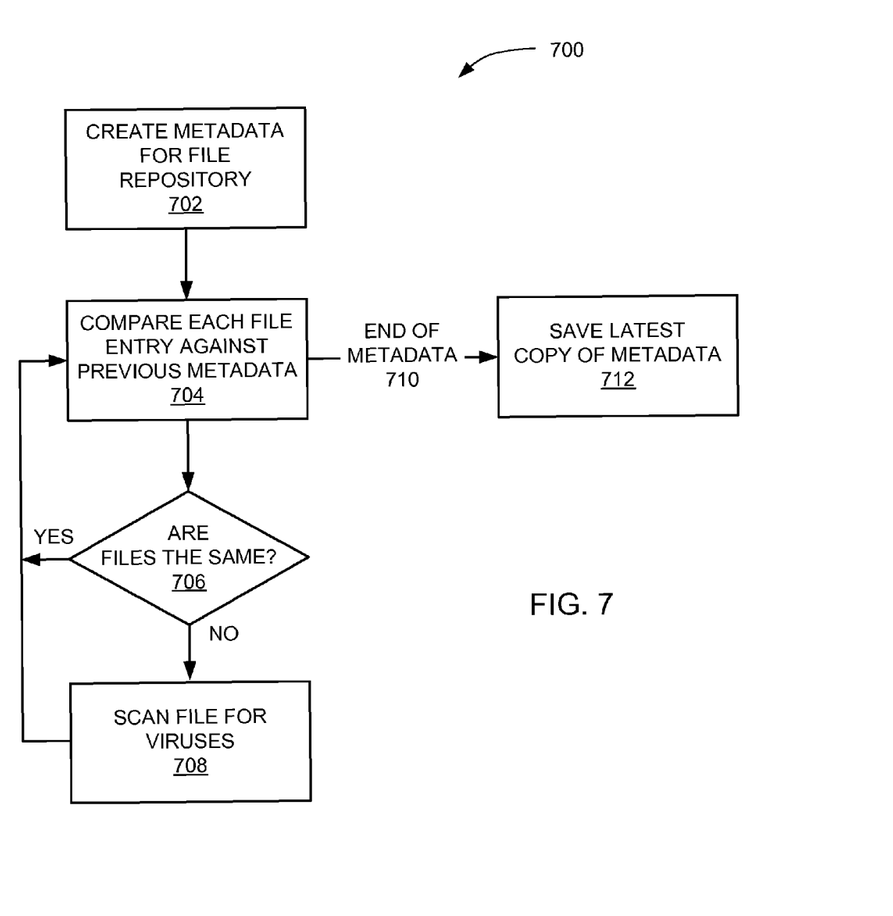
FIG. 7 is a flowchart of a method for beginning a file scan such as the scan of the target file in the block 306 of FIG. 3 and the creation of the newly created metadata in the block 606 of FIG. 6 in accordance with an embodiment of the present invention.

Referring now to FIG. 7, therein is shown a flowchart of a method 700 for beginning a file scan such as the scan of the target file in the block 306 of FIG. 3 and the creation of the newly created metadata in the block 606 of FIG. 6 in accordance with an embodiment of the present invention.

The virus blocker 110 of FIG. 1 creates the metadata file for the file repository in a block 702 and then compares each file entry against the previous metadata in a block 704 from the file repository 108 of FIG. 1.

If a check shows that the files are the same in a block 706, the flowchart moves to the next file. If the file entry is different, the file is scanned. The conditions that start a file scan are differences in file name, size, date and time, or a newly created file.

The files are scanned in a scanned file for viruses block 708 and processes previously discussed. After all the files have been processed and the end of the metadata is reached 710, the latest copy of metadata is stored in a nonvolatile memory in a block 712 for comparison again at a later date.

Figure 8:
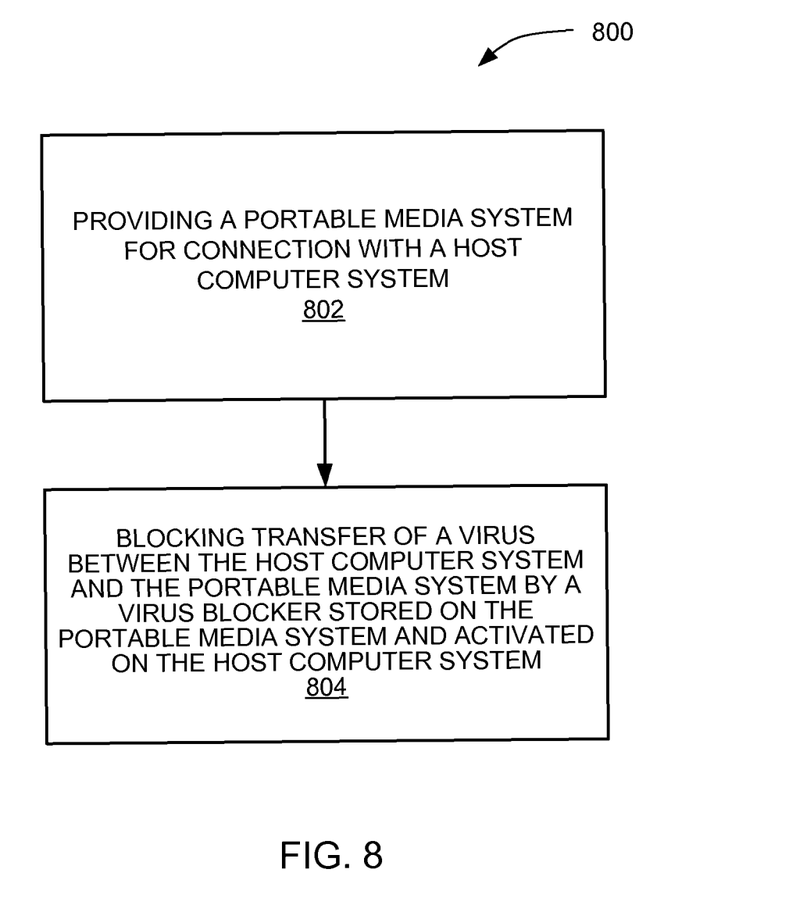
FIG. 8 is a flowchart of a method of operation of the portable media system in accordance with an embodiment of the present invention.

Referring now to FIG. 8, therein is shown a flowchart of a method 800 of operation of the portable media system 102 in accordance with an embodiment of the present invention. The method 800 includes providing: the portable media system for connection with the host computer system in a block 802; and blocking transfer of a virus between the host computer system and the portable media system by a virus blocker stored on the portable media system and activated on the host computer system in a block 804.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a portable media system with a host computer system, the method comprising:
    accessing a public partition of the portable media system for a virus blocker for activation on the host computer system, the portable media system having a private partition for storing a file;
    sending a command from the virus blocker on the host computer system to open the private partition in the portable media system when the virus blocker is downloaded on the host computer system;
    blocking transfer of a virus between the host computer system and the portable media system with the virus blocker executing on the host computer system; and
    sending a command from the virus blocker on the host computer system to close the private partition when the virus blocker terminates activity on the host computer system.

2. The method as claimed in claim 1, further comprising scanning the portable media system with a virus blocker when the portable media system is accessed.

3. The method as claimed in claim 1, further comprising activating the virus blocker and constructing metadata in the host computer system for comparison with metadata in the portable media system for tracking portable media system changes.

4. The method as claimed in claim 1, further comprising connecting the portable media system to the host computer system and preventing access to the private partition until the virus blocker is activated.

5. The method as claimed in claim 1, further comprising activating the virus blocker to automatically process a file infected with the virus including deleting the file infected with the virus, quarantining the file infected with virus, querying a user action for the file infected with the virus, or a combination thereof.

6. The method as claimed in claim 1 further comprising monitoring the portable media system with the virus blocker executing on the host computer system, wherein the monitoring includes monitoring for a file modifications in real time for new or modified files and scanning only the new or modified files for a virus.

7. The method as claimed in claim 1, further comprising activating the virus blocker on the host computer system includes updating the virus blocker by the host computer system.

8. A method of operation of a portable media system with a host computer system, the method comprising:
   accessing a public partition of the portable media system for a virus blocker for activation on the host computer system, the portable media system having a private partition for storing a file;
   connecting the portable media system to the host computer system to download the virus blocker execution file to the host computer system;
   sending a command from the host computer system to the portable media system to open the private partition when the virus blocker execution file is downloaded to the host computer system;
   executing the virus blocker execution file to provide access to the private partition and to block a file containing a computer virus from being transferred between the host computer system and the private partition; and
   sending a command from the host computer system to the portable media system to close the private partition when the virus blocker execution file terminates execution.

9. The method as claimed in claim 8, further comprising:
   scanning the portable media system by the virus blocker execution file when the private partition is accessed;
   waiting for another access of the private partition when no virus containing file is detected by the virus blocker execution file; and
   processing the file containing the computer virus when the virus is detected, wherein processing includes deleting the file containing the computer virus, quarantining the file containing the computer virus, querying a user action for the file containing the computer virus, or a combination thereof.

10. The method as claimed in claim 8 further comprising activating the virus blocker execution file and constructing metadata in the host computer system for comparison with metadata in the portable media system for tracking portable media system file changes, interoperability history, and a combination thereof.

11. The method as claimed in claim 8, further comprising preventing access to the file in the private partition until the virus blocker execution file is activated and the virus blocker execution file is in operation in the background of the host computer system.

12. The method as claimed in claim 8, further comprising activating the virus blocker execution file on the host computer system to automatically process the file containing the computer virus including deleting the file containing the computer virus quarantining the file containing the computer virus, querying a user action for the file containing the computer virus, or a combination thereof.

13. The method as claimed in claim 8, further comprising monitoring the portable media system with the virus blocker execution file executing on the host computer system, wherein the monitoring includes monitoring for a file modification in real time for new or modified files and scanning only the new or modified files for a computer virus, and wherein the host computer system has a user interface to the virus blocker execution file for controlling, monitoring, displaying, and uploading and downloading information related to the virus blocker execution file.

14. The method as claimed in claim 8, wherein sending the command includes sending the command over a communication channel to close the private partition.

15. The method as claimed in claim 8, further comprising activating the virus blocker execution file, wherein activating the virus block execution file includes updating the virus blocker execution file from the internet by the host computer system.

* * * * *

UNITED STATES PATENT AND TRADEMARK OFFICE
CERTIFICATE OF CORRECTION

PATENT NO. : 9,015,840 B2  Page 1 of 1
APPLICATION NO. : 12/796665
DATED : April 21, 2015
INVENTOR(S) : Johnson et al.

It is certified that error appears in the above-identified patent and that said Letters Patent is hereby corrected as shown below:

In the Claims:

Column 6, Claim 2, line 61, delete "with a virus" and insert therefor --with the virus--

Column 7, Claim 5, line 8, delete "with virus" and insert therefor --with the virus--

Column 7, Claim 6, line 14, delete "file modifications" and insert therefor --file modification--

Column 7, Claim 7, line 20, delete "includes updating" and insert therefor --and updating--

Column 8, Claim 13, line 35, delete "and uploading" and insert therefor --uploading--

Signed and Sealed this
Ninth Day of February, 2016

Michelle K. Lee
*Director of the United States Patent and Trademark Office*